(12) United States Patent
Kobayashi et al.

(10) Patent No.: US 7,030,983 B2
(45) Date of Patent: Apr. 18, 2006

(54) METHOD AND APPARATUS FOR ALIGNING DIFFRACTION GRATING

(75) Inventors: Fumitoshi Kobayashi, Osaka (JP); Katsuhide Shimmo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 490 days.

(21) Appl. No.: 10/607,816

(22) Filed: Jun. 27, 2003

(65) Prior Publication Data

US 2004/0233438 A1 Nov. 25, 2004

(30) Foreign Application Priority Data

Jul. 3, 2002 (JP) ............................. 2002-195078

(51) Int. Cl.
*G01B 11/00* (2006.01)
(52) U.S. Cl. .................. 356/399; 356/139.04
(58) Field of Classification Search ................ 356/400, 356/401, 399, 139.04, 139.05, 144–146, 356/328, 334; 359/556
See application file for complete search history.

(56) References Cited

U.S. PATENT DOCUMENTS

| 4,311,389 | A | * | 1/1982 | Fay et al. .................... 356/509 |
|---|---|---|---|---|
| 4,776,696 | A | | 10/1988 | Hettrick et al. |
| 5,231,461 | A | | 7/1993 | Silvergate et al. |
| 6,023,330 | A | | 2/2000 | Marshall et al. |
| 6,118,119 | A | | 9/2000 | Ruschin |
| 6,411,382 | B1 | | 6/2002 | Nishina |

* cited by examiner

*Primary Examiner*—Layla G. Lauchman
(74) *Attorney, Agent, or Firm*—Madson & Austin (57) ABSTRACT

A method and an apparatus for aligning the longitudinal direction of grooves of a diffraction grating to a predetermined direction. The method and apparatus detect a diffracted light pattern sent from the diffraction grating, and displace the diffraction grating such that the direction of an arranging direction obtained from the diffracted light pattern is aligned in the predetermined direction.

14 Claims, 8 Drawing Sheets

METHOD AND APPARATUS FOR ALIGNING DIFFRACTION GRATING

BACKGROUND OF THE INVENTION

The present invention relates to a method and an apparatus for aligning a diffraction grating.

A diffraction grating is used for a spectroscopy module in an optical measuring device or an optical communication device. When assembling a spectroscopy module, an arranging direction of diffracted light needs to be aligned in an arranging direction of a photodetector such that several lights diffracted by a diffraction grating are received by the photodetector. In this case, since the arranging direction of the diffracted lights is generally perpendicular to the longitudinal direction of grooves of the diffraction grating, the photodetector and the diffraction grating need to be aligned.

However, the longitudinal direction of grooves of a diffraction grating is not easily detected. Therefore, to assemble a spectroscopy module that uses a diffraction grating, an active alignment is performed. That is, actual optical signals are sent to the diffraction grating, and the positional relationship between the diffraction grating and a photodetector is adjusted such that diffracted lights are received by the photodetector. This was very troublesome.

Therefore, it has been proposed to form a reference edge, which shows the longitudinal direction of grooves, on a substrate of a diffraction grating in advance. In this case, the reference edge is formed to be parallel or perpendicular to the longitudinal direction of the grooves of the diffraction grating. The arranging direction of a photodetector is then adjusted based on the direction of the reference edge.

A typical diffraction grating used in several devices is cut out from a large substrate, which is an original plate. A commercially available original plate of a diffraction grating is a replica manufactured by transferring a mold, which is formed by a ruling engine or by an interference exposure and a dry etching, on a resin layer, which is formed on a glass substrate. Thus, the parallelism, or perpendicularity, of the direction of grooves of the diffraction grating with respect to the direction of the sides of the substrate is not guaranteed.

Therefore, when cutting the diffraction grating, the direction of the grooves of the diffraction grating needs to be detected and adjusted to align with a predetermined reference direction by an aligning device.

In a conventional alignment device, the position of a diffraction grating is aligned while observing an image of grooves magnified by an optical system. However, if the pitch of the grooves of the diffraction grating is very small, such as if the pitch of the grooves is approximately 1 μm, the alignment of the diffraction grating is difficult.

In the case with alignment of a workpiece of a machining device, such as a dicing device, the workpiece is generally aligned by utilizing, for example, a reference edge or an alignment mark while observing two separate points of the workpiece. However, since several grooves having the same shape are arranged on a diffraction grating, it is difficult to align the diffraction grating accurately because one groove cannot be observed at two separate points.

Figure 12:
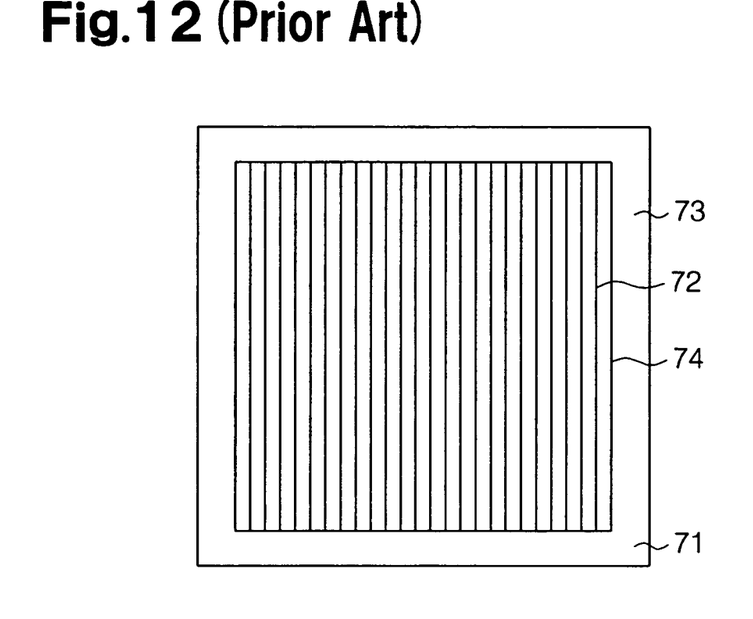
FIG. 12 is a plan view illustrating a schematic structure of a prior art diffraction grating.
Figure 13:
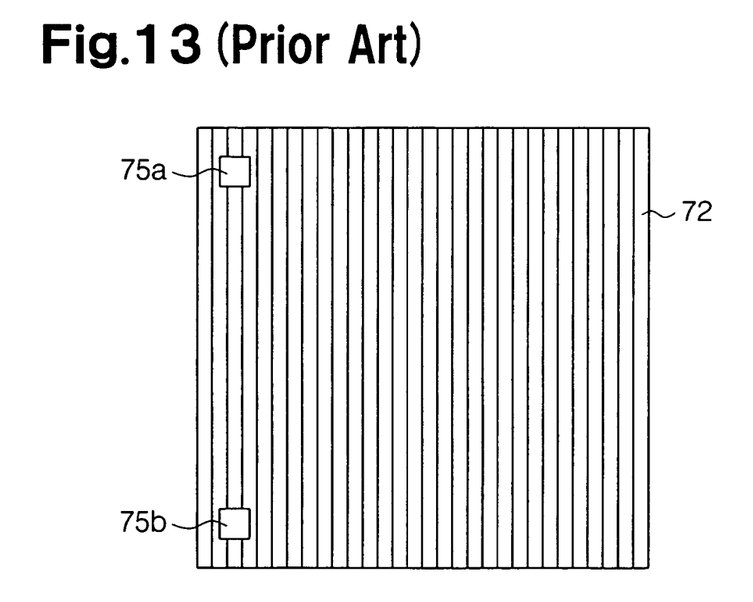
FIG. 13 is a plan view illustrating a schematic structure of another prior art diffraction grating.

Therefore, in a conventional diffraction grating alignment apparatus, a replica of a diffraction grating is manufactured as shown in FIG. 12. The replica has a region 72 and a region 73. The region 72 is formed by transferring a diffraction grating on part of a surface of a substrate 71. The region 73 is portion of the substrate 71 where the diffraction grating is not transferred. A boundary 74 between the region 72 and the region 73 is parallel to or perpendicular to the longitudinal direction of the diffraction grating. The diffraction grating is aligned based on the boundary 74. Also, a replica is manufactured as shown in FIG. 13. The replica of FIG. 13 has the region 72 and alignment marks 75a, 75b. The region 72 is formed by transferring a diffraction grating to the entire surface of a substrate. The alignment marks 75a, 75b are formed along the direction of the grooves of the diffraction grating. The diffraction grating is aligned based on the alignment marks 75a, 75b.

However, in the conventional diffraction grating alignment method, a substrate that is larger than the size of the diffraction grating is used as described above. The diffraction grating is then transferred to part of the substrate and the boundary of the diffraction grating is used for alignment. Therefore, a substrate needs to be used that is larger than the size of the diffraction grating. Also, during a manufacturing process of a replica of a diffraction grating, it is difficult to transfer the boundary of the diffraction grating by the accuracy of higher than or equal to the pitch of the diffraction grating, which is several micrometers. Thus, the longitudinal direction of the grooves of the diffraction grating is not easily aligned at high degree of accuracy.

Further, a replica of a diffraction grating having an alignment mark is manufactured by forming alignment marks in advance in a mold of a diffraction grating and transferring the mold to a substrate. In this case, the mold of the diffraction grating is manufactured by a ruling engine or by a dry etching after performing an interference exposure. Therefore, it was sometimes particularly difficult to form alignment marks. That difficulty leads to increased cost.

Furthermore, transferring alignment marks that have a different size from the diffraction grating during the manufacturing process of a replica is likely to deteriorate the performance of the diffraction grating.

SUMMARY OF THE INVENTION

Accordingly, it is an objective of the present invention to provide a method and an apparatus for aligning a diffraction grating that permit easy alignment of a diffraction grating.

To achieve the above objective, the present invention provides a diffraction grating alignment method for aligning the longitudinal direction of grooves of a diffraction grating in a predetermined direction. The method includes; detecting a diffracted light pattern sent from the diffraction grating; and displacing the diffraction grating such that an arranging direction obtained from the diffracted light pattern is aligned in the predetermined direction.

The present invention also provides a diffraction grating alignment apparatus, which includes a placing device, a displacing device, a light source, a detecting device, and a control device. The placing device places a diffraction grating. The displacing device displaces the diffraction grating located on the placing device. The light source radiates light on the diffraction grating located on the placing device. The detecting device detects a diffracted light pattern sent from the diffraction grating based on radiation of light from the light source. The control device controls the displacing device to displace the diffraction grating such that the direction of an arranging direction obtained from the diffracted light pattern detected by the detecting device is aligned in the predetermined direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A diffraction grating alignment apparatus 1 according to a first embodiment of the present invention will now be described with reference to FIGS. 1 to 8.

Figure 1:
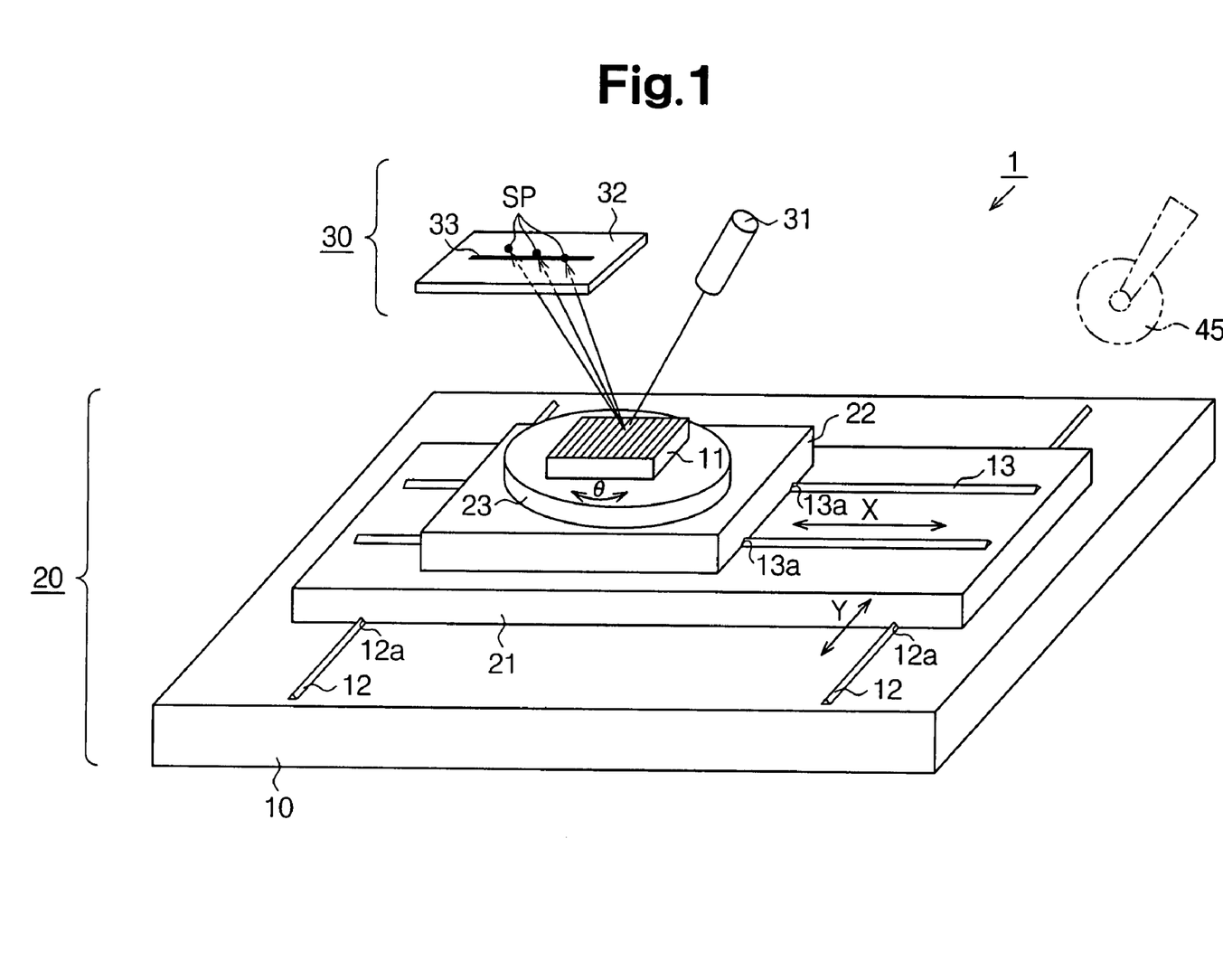
FIG. 1 is a perspective view illustrating a schematic structure of an entire diffraction grating alignment apparatus according to a first embodiment of the present invention.

FIG. 1 is a schematic view for explaining the entire structure of the diffraction grating alignment apparatus 1. The diffraction grating alignment apparatus 1 is formed by a shifting portion 20 and a measuring portion 30.

The structure of the shifting portion 20 will now be described. The shifting portion 20 includes a fixing table 10. The surface of the fixing table 10 is machined to be flat. Y-axis guide rails 12 are located at left and right portions on the fixing table 10 and extend in a predetermined direction (Y-axis direction shown in FIG. 1). A Y-axis shifting table 21 is located on the Y-axis guide rails 12 and is movable along the Y-axis guide rails 12. The surface of the Y-axis shifting table 21 is machined to be flat. Fitting grooves 12a, which fit with the Y-axis guide rails 12, are formed on the bottom surface of the Y-axis shifting table 21.

The Y-axis shifting table 21 reciprocates in the Y-axis direction by rotation of a Y-axis drive motor 61 (see FIG. 8) in the forward and reverse directions. The Y-axis drive motor 61 is located on the fixing table 10.

X-axis guide rails 13 are located at the front and rear portions on the Y-axis shifting table 21 and extend in a direction perpendicular to the Y-axis direction (X-axis direction as viewed in FIG. 1). An X-axis shifting table 22 is located on the X-axis guide rails 13, which are located on the Y-axis shifting table 21. The X-axis shifting table 22 is movable along the X-axis guide rails 13. The surface of the X-axis shifting table 22 is machined to be flat. Fitting grooves 13a, which fit with the X-axis guide rails 13, are formed on the bottom surface of the X-axis shifting table 22.

The X-axis shifting table 22 reciprocates in the X-axis direction by rotation of an X-axis drive motor 62 (see FIG. 8) in forward and reverse directions. The X-axis drive motor 62 is located on the Y-axis shifting table 21.

A placing device, which is a disk-like turntable 23, is located at the center of the top surface of the X-axis shifting table 22. The turntable 23 is rotatable within a horizontal surface on the X-axis shifting table 22.

The turntable 23 is rotated in forward and reverse directions by a displacing device, or a rotary motor, which is a θ-axis drive motor 63 (see FIG. 8) in the first embodiment, located on the X-axis shifting table 22. More specifically, a rotary shaft (not shown) of the θ-axis drive motor 63 projects from the surface of the X-axis shifting table 22. The turntable 23 is secured to the projected rotary shaft.

The surface of the turntable 23 is flat. A suction opening (not shown) is formed at the center of the surface of the turntable 23. The suction opening is connected to an exhaust pump via a pipe, which is not shown.

Outside air is drawn in from the suction opening so that a diffraction grating 11 placed on the turntable 23 is held still.

Therefore, according to the above mentioned shifting portion 20, the diffraction grating 11 located on the surface of the turntable 23 is movable on the fixing table 10 in both the X-axis direction and the Y-axis direction. Furthermore, the diffraction grating 11 is rotatable within the horizontal surface at the predetermined position.

The size of the fixing table 10 is 600 mm in the Y-axis direction and 1200 mm in the X-axis direction. The movable range of the diffraction grating 11 is 450 mm in the Y-axis direction and 900 mm in the X-axis direction.

Figure 2:
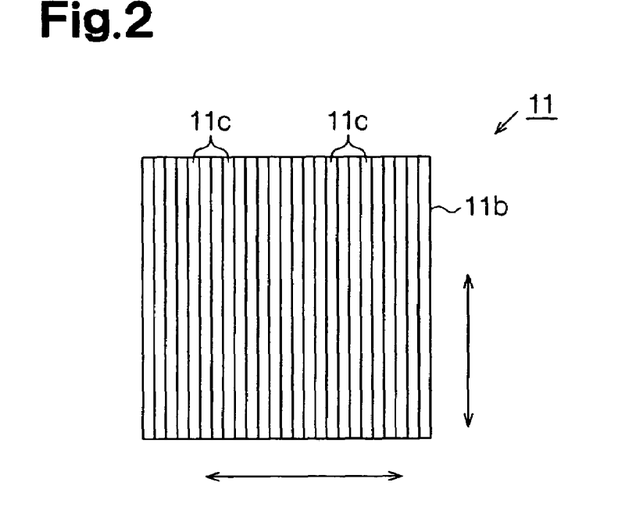
FIG. 2 is a plan view illustrating a schematic structure of a diffraction grating.
Figure 3:
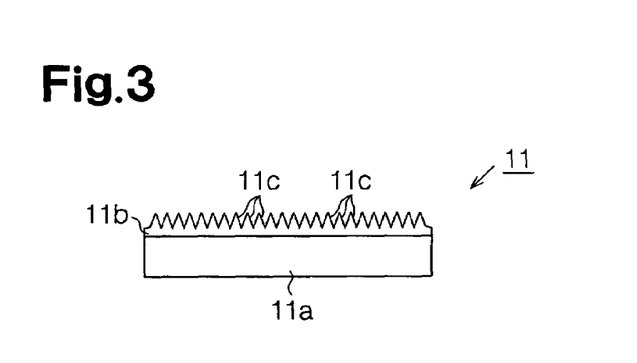
FIG. 3 is a cross-sectional view illustrating a schematic structure of the diffraction grating.

The structure of the diffraction grating 11 will be briefly described with reference to FIGS. 2 and 3. As shown in FIG. 3, the diffraction grating 11 is a replica manufactured by transferring a mold (not shown), which is formed by a ruling engine, onto a resin layer 11b formed on a glass substrate 11a.

The size of the glass substrate 11a is 30 mm in length, 30 mm in width, and 5 mm in height. The resin layer 11b is formed on the entire surface of the glass substrate 11a. The height of the resin layer 11b is approximately 60 μm. Grooves 11c are formed on the resin layer 11b at a 1 μm pitch to be parallel to each other.

The parallelism, or perpendicularity, of the direction of the grooves 11c of the diffraction grating 11 with respect to the sides of the glass substrate 11a is assumed to be not guaranteed.

The structure of the measuring portion 30 will now be briefly described. As shown in FIG. 1, the measuring portion 30 is formed by a laser light source 31 and a detecting device, which is a screen 32 in the first embodiment. The laser light source 31 radiates a spot laser beam at the diffraction grating 11. A diffracted light SP sent from the diffraction grating 11 is projected on the screen 32. The laser light source 31 and the screen 32 are located above the turntable 23 such that the height from the turntable 23 and the angle with respect to the surface of the turntable 23 can be changed.

Figure 4:
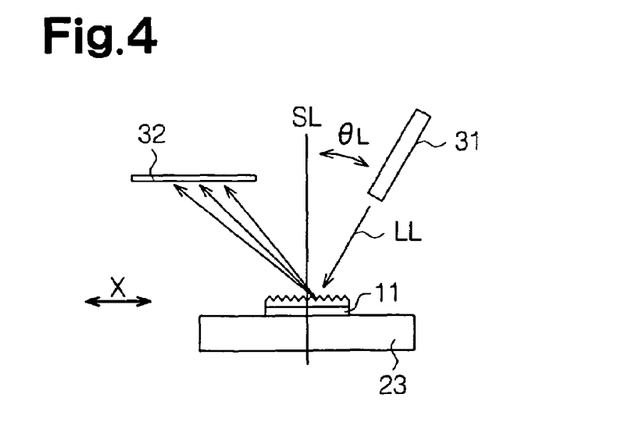
FIG. 4 is a side view illustrating a schematic structure of the diffraction grating alignment apparatus according to the first embodiment.
Figure 5:
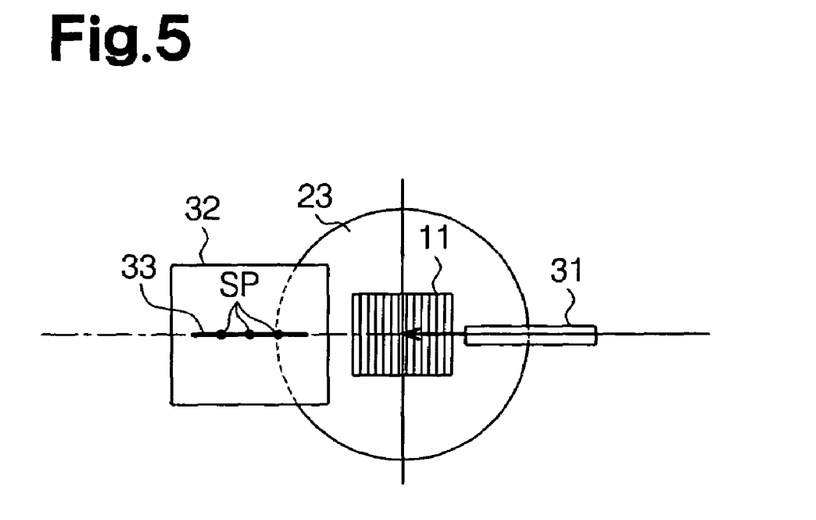
FIG. 5 is a plan view illustrating a schematic structure of the diffraction grating alignment apparatus according to the first embodiment.

FIGS. 4 and 5 are schematic diagrams showing the positional relationship of the measuring portion 30 with respect to the turntable 23 and the diffraction grating 11, which is located on the turntable 23.

As shown in FIG. 4, the laser light source 31 is located such that the laser beam is radiated at a central position of the rotary shaft of the turntable 23. The angle θL between a light axis LL of the laser beam and an axis SL of the rotary shaft is 30 degrees.

When the diffraction grating 11 is located at the central position of the turntable 23, a laser beam is radiated at the diffraction grating 11.

In the first embodiment, a He-Ne laser, which emits a laser beam having the spot diameter of 1 mm and the wave length of 633 nm (single wavelength), is used as the laser light source 31.

As shown in FIG. 4, the screen 32 is located 30 cm above the turntable 23 and is parallel to the surface of the turntable 23. The screen 32 is a translucent resin substrate having the size of 30 cm in length, 20 cm in width, and 1 mm in height. Since part of the diffracted light that is projected on the screen 32 is transmitted through the screen 32, the pattern of the diffracted light can be observed from above the screen 32.

As shown in FIG. 5, a reference line 33 is drawn on the screen 32 such that the reference line 33 extends parallel to the X-axis direction when observed from a direction perpendicular to a plane (the surface of the sheet of FIG. 5) that includes a line parallel to the X-axis, which is the shifting direction of the X-axis shifting table 22; and a line parallel to Y-axis, which is the shifting direction of the Y-axis shifting table 21. In the first embodiment, the reference line 33 is located at the center of the screen 32 and can also be observed from above the screen 32.

In the first embodiment, the laser light source 31, the diffraction grating 11, and the screen 32 are aligned together in the X-axis direction when observed from the direction perpendicular to the plane that includes lines parallel to both the X-axis and the Y-axis. The light axis LL of the spot laser beam radiated from the laser light source 31 and the reference line 33 are aligned in the X-axis direction when observed from the direction perpendicular to the plane that includes a line parallel to the X-axis and a line parallel to the Y-axis.

As shown in FIGS. 1, 4, and 5, when a spot laser beam having a single wavelength is radiated at the diffraction grating 11, several diffracted lights SP, such as first, second, and third diffracted lights SP, are generated. These diffracted lights SP are projected on the screen 32. Therefore, a diffracted light pattern of the diffracted lights SP (three in the first embodiment) is formed on the screen 32.

As shown in FIG. 5, when the laser beam having a single wavelength is diffracted by the diffraction grating 11, the diffracted pattern can be characterized by a straight line perpendicular to the longitudinal direction of the grooves 11c. That is, the diffracted light pattern, which is formed by connecting the spots of the diffracted lights SP (three in the first embodiment), defines a straight line. The straight line (shown by a dashed line in FIG. 5) is perpendicular to the longitudinal direction of the grooves 11c of the diffraction grating 11.

The electric circuit of the diffraction grating alignment apparatus 1 will now be described with reference to FIG. 8.

Figure 8:
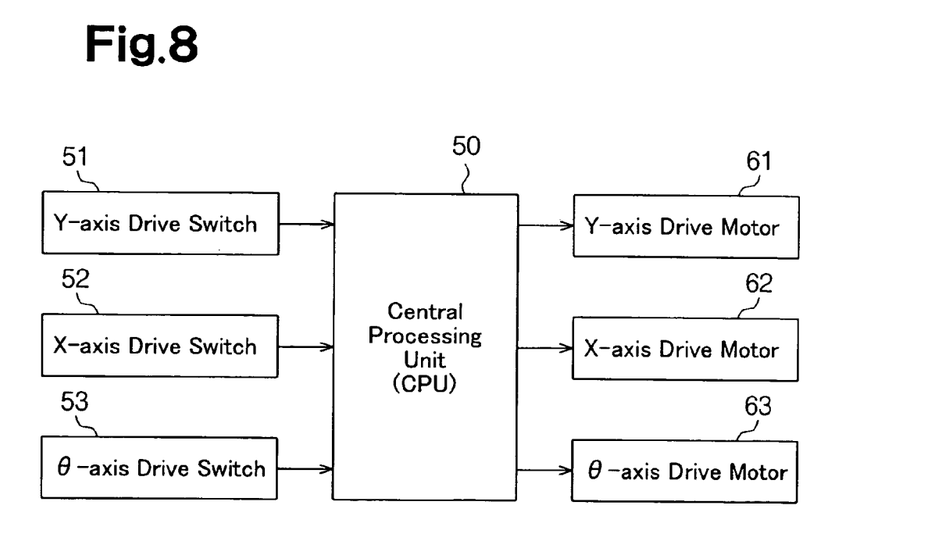
FIG. 8 is a block circuit diagram illustrating a schematic configuration of an electric circuit of the diffraction grating alignment apparatus according to the first embodiment.

As shown in FIG. 8, the electric circuit of the diffraction grating alignment apparatus 1 includes a control device, which is a central processing unit (CPU) 50 in the first embodiment. The CPU 50 is located at a control panel (not shown) of the diffraction grating alignment apparatus 1 and is connected to a Y-axis drive switch 51, an X-axis drive switch 52, and a θ-axis drive switch 53.

The Y-axis drive switch 51 is manipulated to shift the Y-axis shifting table 21. When the Y-axis drive switch 51 is manipulated, a manipulation signal is sent to the CPU 50. The X-axis drive switch 52 is manipulated to shift the X-axis shifting table 22. When the X-axis drive switch 52 is manipulated, a manipulation signal is sent to the CPU 50. The θ-axis drive switch 53 is manipulated to shift the turntable 23. When the θ-axis drive switch 53 is manipulated, a manipulation signal is sent to the CPU 50.

The CPU 50 is connected to the Y-axis drive motor 61, which shifts the Y-axis shifting table 21; the X-axis drive motor 62, which shifts the X-axis shifting table 22; and the θ-axis drive motor 63, which rotates the turntable 23.

The CPU 50 rotates the Y-axis drive motor 61 in forward and reverse directions in accordance with manipulation signals from the Y-axis drive switch 51. The CPU 50 rotates the X-axis drive motor 62 in forward and reverse directions in accordance with manipulation signals from the X-axis drive switch 52. The CPU 50 further rotates the θ-axis drive motor 63 in forward and reverse directions in accordance with manipulation signals from the θ-axis drive switch 53.

A method for determining the position of the diffraction grating 11 will now be described.

The diffraction grating 11 is held still on the surface of the turntable 23 by the suction force. The Y-axis drive switch 51 and the X-axis drive switch 52 are then manipulated to shift the Y-axis shifting table 21 and the X-axis shifting table 22 such that a spot laser beam radiated from the laser light source 31 is radiated at the center of the diffraction grating 11. The θ-axis drive switch 53 is manipulated such that the longitudinal direction of the grooves 11c substantially coincides with the Y-axis direction, which is the shifting direction of the Y-axis shifting table 21.

When a spot laser beam having a single wavelength is radiated from the laser light source 31 at the surface of the diffraction grating 11 in this state, a diffracted light pattern of the diffracted lights SP (three in the first embodiment) generated by the diffraction grating 11 is projected on the screen 32. As shown in FIG. 5, the diffracted light pattern is arranged along a straight line that is perpendicular to the longitudinal direction of the grooves 11c of the diffraction grating 11.

Figure 6:
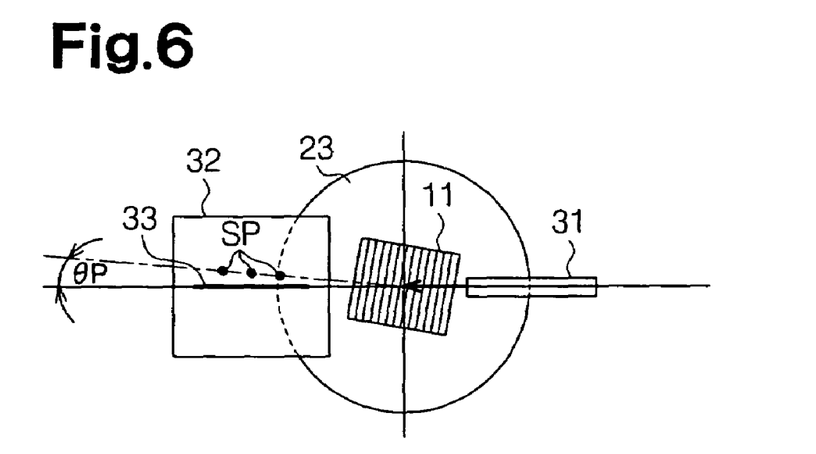
FIG. 6 is an explanatory diagram showing a diffraction grating alignment method according to the first embodiment.
Figures 7A, 7B:
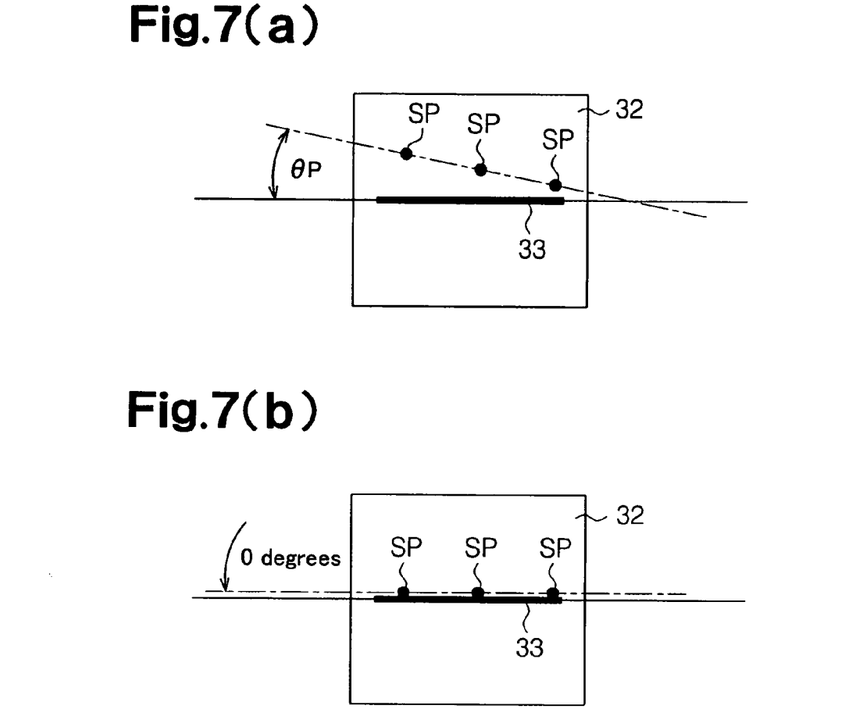
FIG. 7(a) is a plan view explaining an angle between a diffracted light pattern and a reference line.
FIG. 7(b) is a plan view explaining that the diffracted light pattern is parallel to the reference line.

Therefore, if the longitudinal direction of the grooves 11c of the diffraction grating 11 is displaced from the Y-axis direction, the diffracted light pattern, which is perpendicular to the longitudinal direction of the grooves 11c, is displaced from the X-axis direction, which is perpendicular to the Y-axis direction as shown in FIGS. 6 and 7(a). Thus, on the screen 32, the diffracted light pattern is displaced from the reference line 33, which is parallel to the X-axis, and is arranged on a straight line that is displaced by a predetermined angle θP from the reference line 33.

By manipulating the θ-axis drive switch 53 to rotate the turntable 23, the position of the grooves 11c of the diffraction grating 11 is changed. As a result, the position of the diffracted light pattern is changed on the screen 32, and the angle θP between the diffracted light pattern and the reference line 33 is changed. By rotating the turntable 23 such that the angle θP between the diffracted light pattern and the reference line 33 becomes zero, the diffracted light pattern becomes parallel to the reference line 33.

As described above, the diffracted light pattern is adjusted to be parallel to the reference line 33 such that the longitudinal direction of the grooves 11c of the diffraction grating 11 becomes parallel to the Y-axis direction as shown in FIGS. 5 and 7(b). That is, the longitudinal direction of the grooves 11c of the diffraction grating 11, which is perpendicular to the diffracted light pattern, is adjusted to become parallel to the Y-axis direction, which is perpendicular to the reference line 33.

As described above, the position of the diffraction grating 11 is determined on the turntable 23. Then, for example, the diffraction grating 11 is cut by a cutter 45, which is shown by a chain double-dashed line in FIG. 1. The cutter 45 is shifted in the X-axis direction to cut the diffraction grating 11. Thus, the cut surface of the diffraction grating 11 is perpendicular to the longitudinal direction of the grooves 11c of the diffraction grating 11. The diffraction grating 11 that has a cut surface perpendicular to the longitudinal direction of the grooves 11c of the diffraction grating 11 facilitates a process to determine the arranging direction of a photodetector when assembling a spectroscopy module.

The first embodiment of the present invention provides the following advantages.

(1) The longitudinal direction of the grooves 11c of the diffraction grating 11 is adjusted to be parallel to the shifting direction of the Y-axis shifting table 21 by adjusting the direction of the straight line that connects the diffracted lights SP of the diffracted light pattern to become parallel to the reference line 33. Therefore, a diffraction grating need not have an alignment mark or a reference line for determining the position, as is needed in a conventional diffraction grating alignment apparatus. That is, a diffraction grating that has grooves on the entire surface of a substrate can be aligned with the diffraction grating alignment apparatus of the first embodiment.

(2) The diffraction grating 11 is rotated by the turntable 23 such that the longitudinal direction of the grooves 11c of the diffraction grating 11 becomes parallel to the shifting direction of the Y-axis shifting table 21. Therefore, the position of the diffraction grating 11 is easily adjusted.

Figure 10:
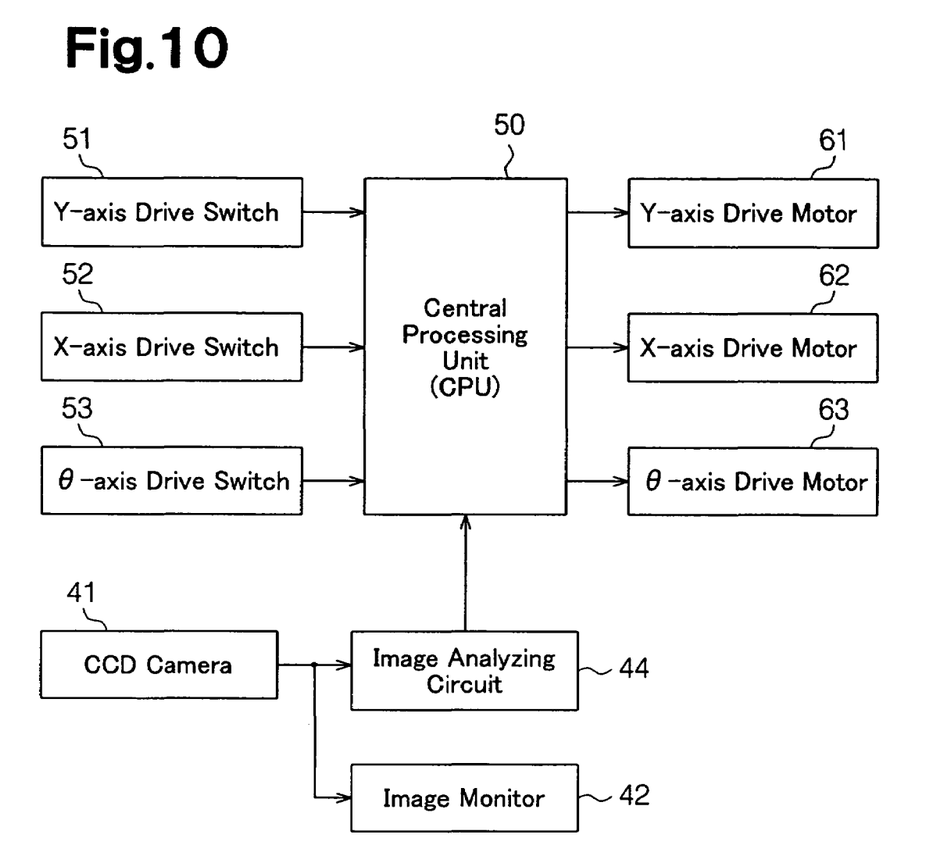
FIG. 10 is a block circuit diagram illustrating a schematic configuration of an electric circuit of the diffraction grating alignment apparatus according to the second embodiment.
Figure 11:
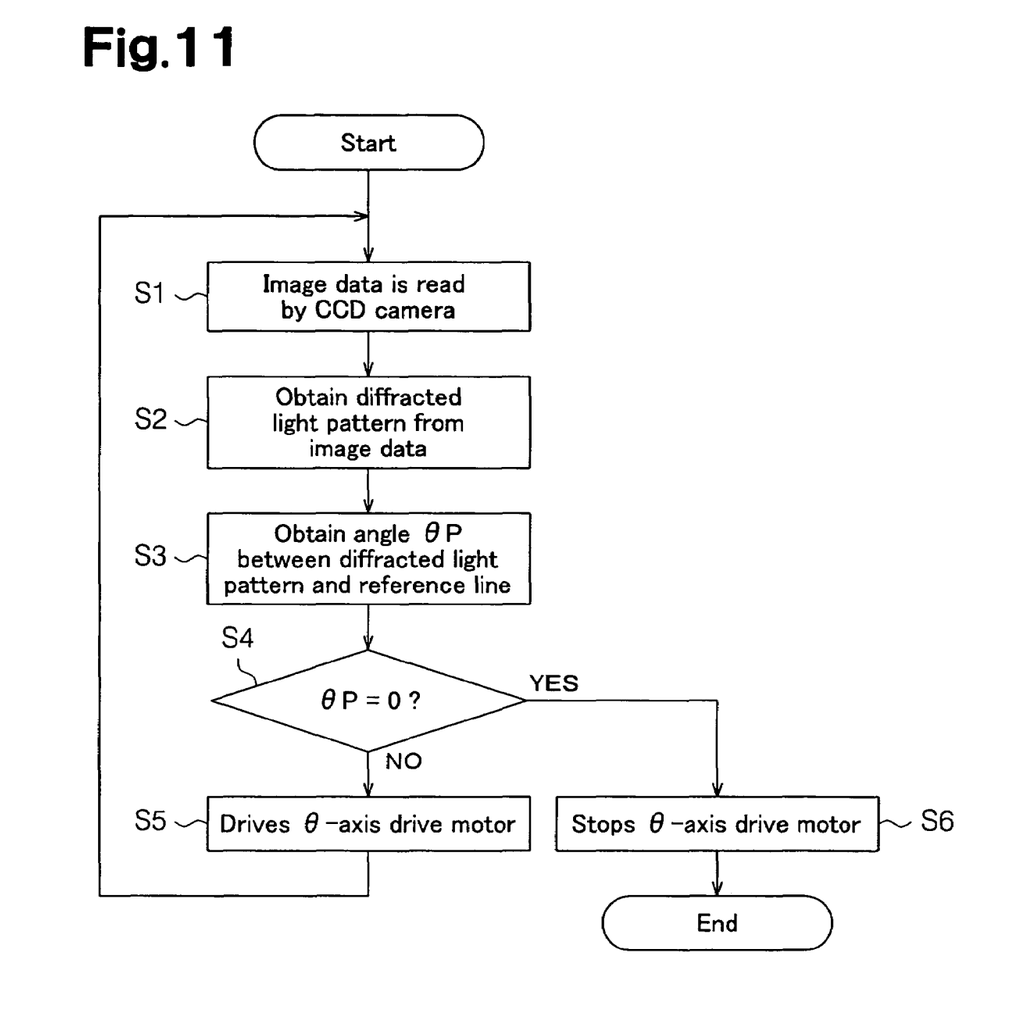
FIG. 11 is a flowchart of a diffraction grating alignment method according to the second embodiment.

A method and apparatus for aligning a diffraction grating according to a second embodiment will now be described with reference to FIGS. 9 to 11. The differences from the first embodiment will mainly be discussed below.

Figure 9:
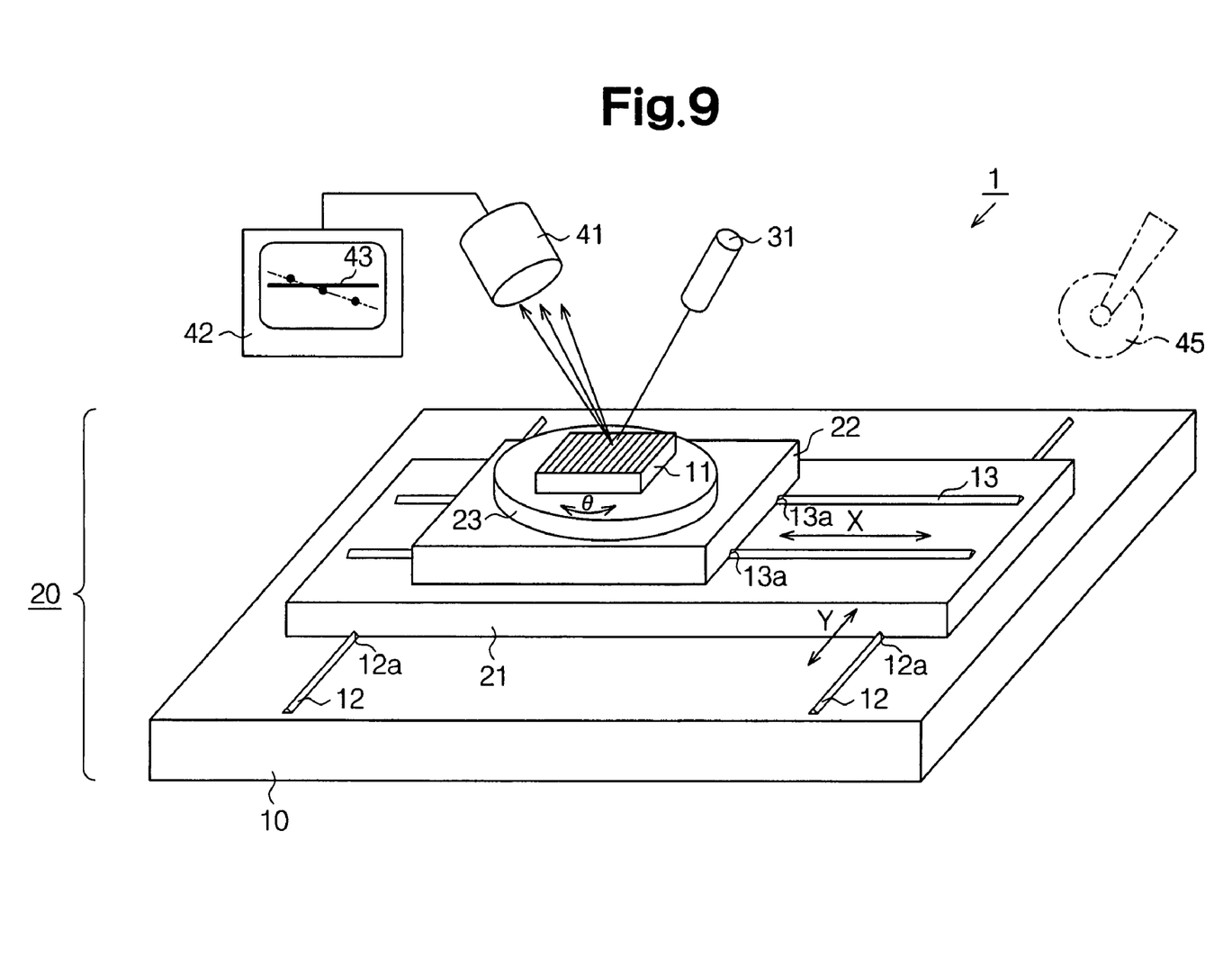
FIG. 9 is a perspective view illustrating a schematic structure of an entire diffraction grating alignment apparatus according to a second embodiment.

FIG. 9 shows the diffraction grating alignment apparatus 1 according to the second embodiment. As shown in FIG. 9, an image reading device, which is a CCD camera 41 in the second embodiment, is located above the turntable 23 instead of the screen 32 of the first embodiment (see FIG. 1). The CCD camera 41 reads the diffracted light pattern sent from the diffraction grating 11 located on the surface of the turntable 23.

The CCD camera 41 receives an image of a diffracted light pattern and sends image data to a display device, which is an image monitor 42 in the second embodiment. The image monitor 42 displays the image of the diffracted light pattern based on the received image data. The image monitor 42 also displays the reference line 43, which indicates the shifting direction (X-axis direction) of the X-axis shifting table 22.

The image data from the CCD camera 41 is sent to an analyzing device, which is an image analyzing circuit 44. The image analyzing circuit 44 recognizes an image based on the image data. That is, the image analyzing circuit 44 recognizes the diffracted light pattern by performing a signal processing of the image data. The image analyzing circuit 44 determines the position of the diffracted light pattern with respect to the reference line 43, that is, the angle $\theta P$ between the diffracted light pattern and the reference line 43. The image analyzing circuit 44 sends the analysis result, that is, the data of the angle $\theta P$ (angle data) to the CPU 50. The CPU 50 controls the $\theta$-axis drive motor 63 such that the angle $\theta P$ becomes zero based on the angle data.

The operations of the diffraction grating alignment apparatus according to the second embodiment will now be described with reference to a flowchart shown in FIG. 11.

In step S1, when three diffracted lights SP are read by the CCD camera 41, the image data is sent to the image monitor 42 and the image analyzing circuit 44. The image monitor 42 then displays the three diffracted lights SP and the reference line 43 based on the image data. Therefore, the angle $\theta P$ between the diffracted light pattern and the reference line 43 can be checked visually by looking at the three diffracted lights SP and the reference line 43 displayed on the image monitor 42.

Next, in step S2, the image analyzing circuit 44 that has received the image data obtains the center of gravity of each of the three diffracted lights SP and calculates a straight line (diffracted light pattern) that connects the center of gravity of each diffracted light SP. Consequently, in step S3, the image analyzing circuit 44 determines the angle $\theta P$ between the calculated straight line and the reference line 43. The image analyzing circuit 44 then sends the angle $\theta P$ to the CPU 50 as the angle data.

In step S4, the CPU 50 that has received the angle data determines whether the angle $\theta P$ is zero. If it is determined that the angle $\theta P$ is not zero, that is, if the decision outcome of step S4 is negative, the CPU 50 proceeds to step S5. In step S5, the CPU 50 controls the $\theta$-axis drive motor 63 to rotate the turntable 23 such that the angle $\theta P$ becomes zero.

The CPU 50 repeats steps S1 to S5 until the angle $\theta P$ becomes zero. If it is determined that the angle $\theta P$ is zero, that is, if the decision outcome of step S4 is positive, the CPU 50 proceeds to step S6. In step S6, the CPU 50 assumes that the diffracted light pattern and the reference line 43 are parallel to each other, that is, the longitudinal direction of the grooves 11c of the diffraction grating 11 is aligned to be parallel to the Y-axis direction, and stops the $\theta$-axis drive motor 63. When the $\theta$-axis drive motor 63 is stopped, the alignment of the diffraction grating 11 is terminated.

In this case also, the diffraction grating 11 that has been aligned on the turntable 23 is cut by, for example, a cutter 45, which is shown by a chain double-dashed line in FIG. 9. The cutter 45 is shifted in the X-axis direction to cut the diffraction grating 11. The cut surface of the diffraction grating 11 is perpendicular to the longitudinal direction of the grooves 11c of the diffraction grating 11. Therefore, the diffraction grating 11 that has the cut surface perpendicular to the longitudinal direction of the grooves 11c of the diffraction grating 11 facilitates a process to determine the arranging direction of a photodetector when assembling a spectroscopy module.

The second embodiment provides the following advantages in addition to the advantages (1) and (2) of the first embodiment.

(3) The angle between the straight line of the diffracted light pattern and the reference line 43, which is parallel to the X-axis direction, is automatically analyzed. Since the angle of the turntable 23 is adjusted based on the analysis result, the position is determined in a short time.

(4) Since the positional information of the diffracted light pattern is obtained at high accuracy by the CCD camera 41, the position can be determined at high accuracy.

It should be apparent to those skilled in the art that the present invention may be embodied in many other specific forms without departing from the spirit or scope of the invention. Particularly, it should be understood that the invention may be embodied in the following forms.

In the first and second embodiments, the disk-like turntable 23 is used as the placing device for placing the diffraction grating 11. However, turntables having other shapes may be used.

In the first embodiment, the screen 32 need not be located 30 cm above the turntable 23 to be parallel to the surface of the turntable 23. That is, as long as the screen 32 is located at the height that permits projection of the diffracted light pattern sent from the diffraction grating 11, the screen 32 may be located above the turntable 23 by any distance other than 30 cm such that the screen 32 faces the surface of the turntable 23.

In the first embodiment, the screen 32 need not be formed by a translucent resin substrate. That is, the screen 32 may be opaque or made of material other than resin. Further, the screen 32 need not be formed by a substrate.

In the first embodiment, the light axis LL of the spot laser beam that is radiated from the laser light source 31 and the reference line 33 need not be aligned in the X-axis direction when observed from the direction perpendicular to the plane that includes a line parallel to the X-axis and a line parallel to the Y-axis. That is, the straight line that connects the spots of the diffracted lights SP may be perpendicular to the longitudinal direction of the grooves 11c of the diffraction grating 11 regardless of the direction of the light axis LL of the spot laser beam. The second embodiment may also be modified in the same manner.

In the first and second embodiments, the laser light source 31 having a single wavelength need not be used as a light source for radiating a spot laser beam at the diffraction grating 11. That is, a light source that radiates light having multiple wavelengths may be used. In this case also, a diffracted light pattern that connects spots of several diffracted lights SP sent from the diffraction grating 11 describes a straight line, which is perpendicular to the longitudinal direction of the grooves 11c of the diffraction grating 11. A light source that radiates light having a continuous wavelength may also be used.

In the first and second embodiments, a diffracted light pattern formed by the three spot diffracted lights is detected. However, the number of spots of the spot diffracted lights to be detected may be any plural number other than three.

In the first and second embodiments, the shifting portion 20 is formed by the fixing table 10, the Y-axis shifting table 21, the X-axis shifting table 22, and the turntable 23. Instead, the Y-axis shifting table 21 and the X-axis shifting table 22 may be omitted. In this case, the shifting portion 20 is formed by the turntable 23 and the fixing table 10 that has a displacing device for displacing the diffraction grating 11 by rotating the turntable 23.

In the second embodiment, the positional relationship of the diffracted light pattern received by the CCD camera 41 with respect to the reference line 43 is analyzed by the image analyzing circuit 44 to calculate the angle θP between the diffracted light pattern and the reference line 43. The CPU 50 is designed to control the θ-axis drive motor 63 to rotate the turntable 23 such that the calculated angle θP becomes zero. Instead, the turntable 23 may be rotated by manipulating the θ-axis drive switch 53 such that the angle θP becomes zero while visually checking the angle θP between the diffracted light pattern and the reference line 43 on the image monitor 42.

In the first and second embodiments, the cutter 45 is shifted in the X-axis direction to cut the diffraction grating 11. However, any device other than cutters, such as a marker, may be used.

Therefore, the present examples and embodiments are to be considered as illustrative and not restrictive and the invention is not to be limited to the details given herein, but may be modified within the scope and equivalence of the appended claims.

The invention claimed is:

1. A diffraction grating alignment method for aligning the longitudinal direction of grooves of a diffraction grating in a predetermined direction, the method comprising;
   detecting a diffracted light pattern sent from the diffraction grating; and
   displacing the diffraction grating such that an arranging direction obtained from the diffracted light pattern is aligned in the predetermined direction.

2. The diffraction grating alignment method according to claim 1, wherein detecting the diffracted light pattern utilizes a screen that faces the diffraction grating, wherein the diffracted light pattern is projected on the screen, wherein a reference line extends in the predetermined direction on the screen, and wherein an angle between the arranging direction obtained from diffracted light pattern and the reference line is detected.

3. The diffraction grating alignment method according to claim 1, wherein detecting the diffracted light pattern includes:
   reading the diffracted light pattern;
   displaying an image of the read diffracted light pattern; and
   calculating an angle between a reference line and an arranging direction obtained from the diffracted light pattern, wherein the reference line extends in the predetermined direction.

4. The diffraction grating alignment method according to claim 1, wherein detecting the diffracted light pattern includes:
   reading the diffracted light pattern;
   recognizing the diffracted light pattern based on data of the read diffracted light pattern and analyzing the relative relationship between the diffracted light pattern and the predetermined direction; and
   displacing the diffraction grating based on a result obtained by analyzing the relative relationship.

5. A diffraction grating alignment apparatus comprising:
   a placing device for placing a diffraction grating;
   a displacing device for displacing the diffraction grating located on the placing device;
   a light source for radiating light on the diffraction grating located on the placing device;
   a detecting device for detecting a diffracted light pattern sent from the diffraction grating based on radiation of light from the light source; and
   a control device for controlling the displacing device to displace the diffraction grating such that the direction of an arranging direction obtained from the diffracted light pattern detected by the detecting device is aligned in the predetermined direction.

6. The diffraction grating alignment apparatus according to claim 5, wherein the detecting device is a screen that faces the diffraction grating, wherein the diffracted light pattern is projected on the screen, and wherein a reference line is located on the screen to extend in the predetermined direction.

7. The diffraction grating alignment apparatus according to claim 5,
wherein the detecting device includes an image reading device for reading the diffracted light pattern and a display device for displaying an image of the diffracted light pattern read by the image reading device, and
wherein the display device displays a reference line with the diffracted light pattern, and wherein the reference line extends along the predetermined direction.

8. The diffraction grating alignment apparatus according to claim 6,
wherein the placing device is a turntable, and wherein the displacing device is a rotary motor for rotating the turntable, and
wherein the control device controls the rotary motor based on a switch, and wherein the switch is manipulated to rotate the rotary motor in forward and reverse directions.

9. The diffraction grating alignment apparatus according to claim 5,
wherein the detecting device includes an image reading device and an analyzing device, wherein the image reading device reads the diffracted light pattern, wherein the analyzing device recognizes the diffracted light pattern based on data of diffracted light pattern read by the image reading device, and wherein the analyzing device analyzes the relative relationship between the diffracted light pattern and the predetermined direction, and
wherein the control device controls the displaying device based on an analysis result of the analyzing device to displace the diffraction grating.

10. The diffraction grating alignment apparatus according to claim 9,
wherein the placing device is a turntable, and wherein the displacing device is a rotary motor for rotating the turntable, and
wherein the control device controls the rotary motor based on the analysis result of the analyzing device.

11. The diffraction grating alignment apparatus according to claim 5, further comprising a machining device for machining the diffraction grating that is aligned on the placing device.

12. The diffraction grating alignment apparatus according to claim 11, wherein the machining device is a cutter.

13. The diffraction grating alignment apparatus according to claim 5, wherein the light source is a laser light source, and wherein the diffracted light pattern includes a plurality of diffracted lights.

14. The diffraction grating alignment apparatus according to claim 9, wherein the image reading device is a CCD camera.

* * * * *